(12) United States Patent
Demsey et al.

(10) Patent No.: US 7,203,941 B2
(45) Date of Patent: Apr. 10, 2007

(54) ASSOCIATING A NATIVE RESOURCE WITH AN APPLICATION

(75) Inventors: Seth M. Demsey, Kirkland, WA (US); Scott K. Holden, Bellevue, WA (US); William Michael Zintel, Kenmore, WA (US); Brian J. Smith, Seattle, WA (US); Tuan Huynh, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 799 days.

(21) Appl. No.: 10/294,337

(22) Filed: Nov. 14, 2002

(65) Prior Publication Data

US 2004/0098724 A1 May 20, 2004

(51) Int. Cl.
G06F 9/455 (2006.01)
G06F 9/46 (2006.01)
G06F 12/00 (2006.01)

(52) U.S. Cl. .......................... 718/1; 718/104; 711/100
(58) Field of Classification Search ............... 717/140; 718/1, 104; 711/100
See application file for complete search history.

(56) References Cited

U.S. PATENT DOCUMENTS

| | | | |
|---|---|---|---|
| 6,606,742 B1 * | 8/2003 | Orton et al. | 717/140 |
| 2003/0061570 A1 * | 3/2003 | Hatori et al. | 715/530 |
| 2003/0217087 A1 * | 11/2003 | Chase et al. | 709/1 |

* cited by examiner

Primary Examiner—Meng-Al T. An
Assistant Examiner—Kenneth Tang
(74) Attorney, Agent, or Firm—Lee & Hayes, PLLC

(57) ABSTRACT

Handles associate respective native resources with an application that utilizes a library to call for the native resource. Each handle is created to track a native resource that has been allocated to an application. All native resources associated with the application are freed by examining the handles to find those native resources still being held by the application after they are no longer being used, or when that application has been, or is being, terminated. If a native resource is requested by the application and found to be unavailable, the handles are reviewed to collect allocated native resources that are found to be unneeded by their respective applications. A collected native resource corresponding to the requested native resource is thereby made available to be reallocated to the requesting application.

49 Claims, 6 Drawing Sheets

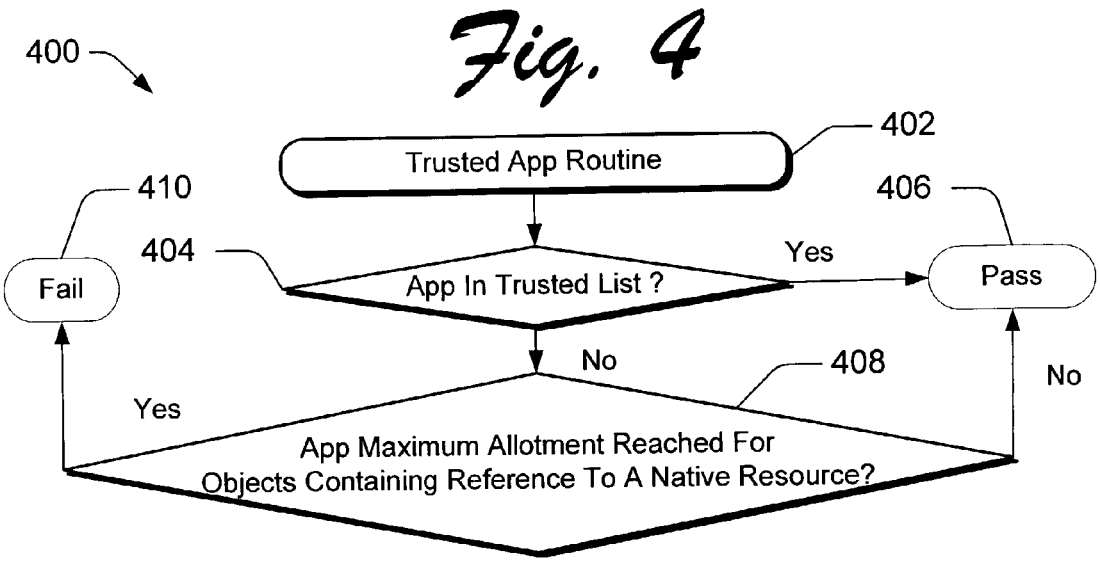
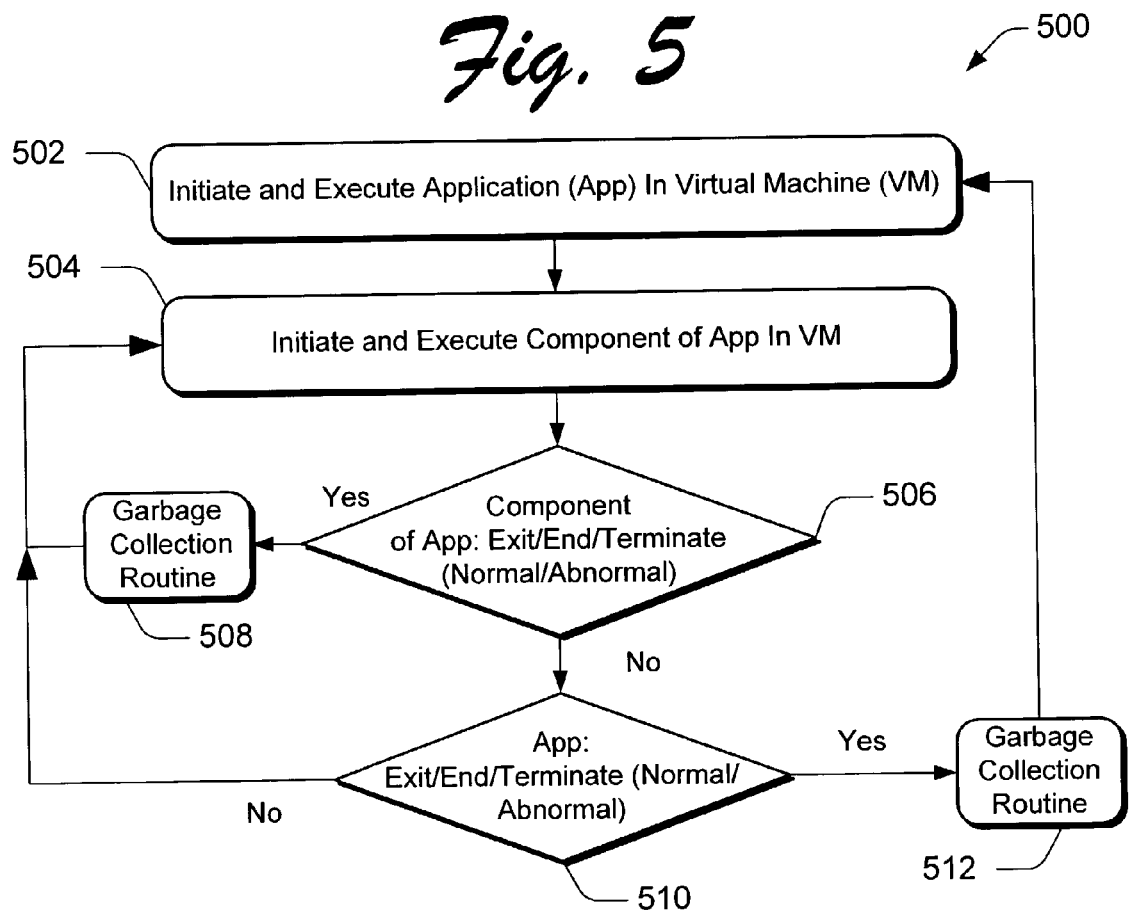

ASSOCIATING A NATIVE RESOURCE WITH AN APPLICATION

TECHNICAL FIELD

The present invention relates to applications using native resources, and more particularly to methods, apparatuses, and computer readable medium for associating a native resource of an operating system with an application.

BACKGROUND

When executing managed code in a virtual machine (VM) environment, an application can run on different platforms. In such VM environments, native resources are typically allocated to applications using system calls. These system calls can be made when executing code in the VM environment by callers from class libraries. These class libraries commonly call through to the native operating system to perform low level functionality, such as drawing and windowing management. When these system calls are made, native resources are allocated as an effect of the library call from the caller. These native resources must be kept in synchronization with their counterpart in a managed code portion of the VM. When the managed code portion of the VM is through using the native resources, it is desirable that these native resources be freed so that they can be allocated for use by other applications.

Current techniques for exposing class libraries in a VM environment require a substantial amount of overhead when marshalling the data necessary to create, maintain synchronization, and destroy native resources that are involved in applications, and components thereof (e.g. such as User Interface (UI) resources involved in drawing and windowing management). In many computer-based applications, a new native resource is produced each time a new native resource object is created. A developer who writes or codes an application can inadvertently neglect the effects on the processor speed and memory consumption that occurs when the code fails to release a large number of native resources that have been allocated to the application. Such neglect can slow down processor speed, and make memory and native resources unavailable to other applications and components thereof.

A routine can be written by a developer to remove native resource objects that have been produced by an application. Such a routine to remove native resources must be conscientiously coded due to the significant processing required for its execution and due to the need to remove each of the native resources individually. Alternately, the native resources can be removed after some prescribed period, in which case there may be a considerable number of native resources waiting for removal for the duration of the prescribed period. Storing such a considerable number of native resources may make such tasks as drawing and windowing management slow in applications that require corresponding native resources (e.g. UI resources). Additionally, present computer applications typically produce multiple concurrently-saved copies of the native resource. For example, as a UI resource is transferred between the VM, the native environment, and the operating system (OS) itself, a copy of each UI resource object is stored in memory associated with each location.

Applications that run on such computer environments as stand alone computers, networked computer environments, and computer devices typically inefficiently manage native resources, but such inefficiency is typically ignored due to the large processing abilities of these computer environments. Smaller and less powerful, memory constrained and processor constrained devices (i.e. resource constrained devices) such as personal digital assistants (PDAs), cellular telephones, computer devices, embedded devices, microprocessor devices, and microcomputer devices are becoming increasingly popular. Resource constrained devices rely on more limited software, processors, memory and operating systems than those applied to full size computer environments. Applying a large number of system calls to resource constrained devices commonly make the devices prohibitively slow to perform many application functions. The system calls for native resources in resource constrained devices (especially for demanding applications that require extensive use of UI resources) are so processor intensive that the processor and memory resources become significantly strained. A large number of such system calls results in undesirable performance characteristics. It would be an advantage in the art to free a native resource after its use by an application so that it can be made available for allocation to another application, where requirements for the same that are placed upon the developer of the application are minimal. Consequently, there is a need for improved methods, apparatuses, and computer readable medium that can provide such a capability.

SUMMARY

Tracking mechanisms (hereinafter, "handles") are used to track native resources. Each handle is associated with a native resource in a domain of an application that requested the native resource. The application utilizes a library to call for the native resource. Each handle is created, in response to the library call for the native resource, by an allocation routine that allocates the native resource to the domain of the application. In one implementation, when the domain of the application is being terminated, all native resources previously allocated to domain of the application are freed. In another implementation, native resources are freed by examining of the handles to find those native resources that are still being held by the domain of the application has been terminated. In still another implementation, when an application makes a request for a native resource that is found to be unavailable, a collection routine reviews the handles to free those native resources that are found to be no longer needed by the respective applications to which they were allocated so that they can be reallocated. If a native resource that is freed by the collection routine corresponds to the requested native resource, the freed native resource is reallocated to the requesting application.

BRIEF DESCRIPTION OF THE DRAWINGS

The same numbers are used throughout the drawings to reference like features.

FIG. 4 illustrates a flow chart of one implementation of a method for ascertaining whether to allocate a requested native resource to an application, which method can be performed with the implementation of the method illustrated by the flowchart in FIG. 3;

FIG. 5 illustrates a flow chart of one implementation of a method for native resource collection that may be performed after execution of an application, or component thereof, has been terminated;

DETAILED DESCRIPTION

Figure 1:
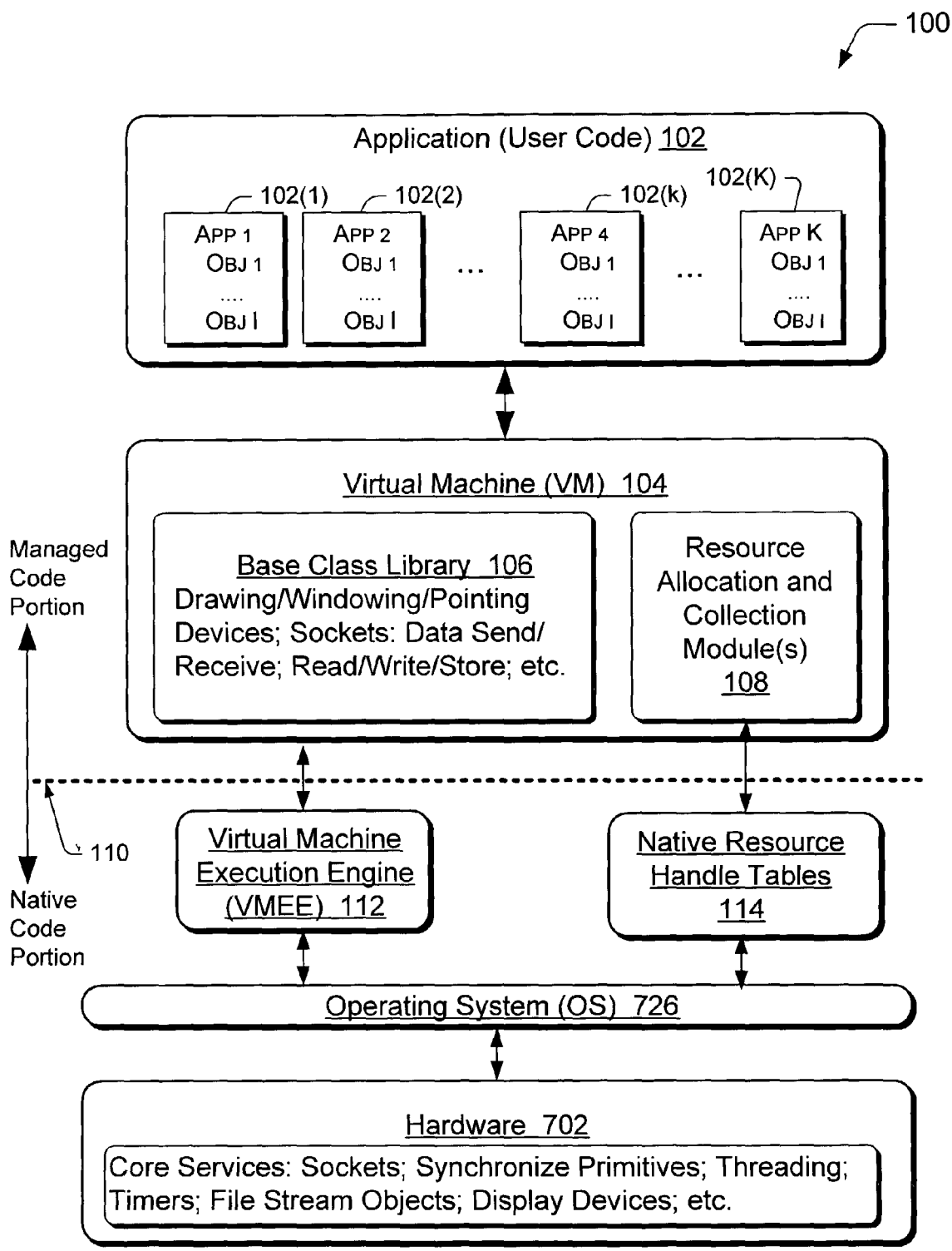
FIG. 1 illustrates one embodiment of a computer environment integrating a virtual machine (VM) in a managed code portion, where the computer environment has a native code portion that includes a VM execution engine, native resource handle tables, and an operating system.

The methods, apparatuses, and computer readable media presented here provide implementations for the allocation of a native resource to an application, or component thereof, which is executing in a virtual or native machine environment. The native resource can be an operating system (OS) resource such as may involve core services related to sockets, synchronization of primitives, threading, timers, file stream objects, display devices, etc. Implementations also provide for a release of a native resource when the application or component thereof to which the native resource has been allocated no longer needs the allocated native resource. By deterministically releasing the previously allocated native resource, it can be made available for allocation to other applications and components thereof, including to applications that execute in virtual or native machine environments.

When an application calls a library that relies on the allocation of a native resource, the implementations disclosed herein free the developer of the application from providing code to free the allocated native resource when the application is finished using the native resource. Moreover, implementations provide for the tracking of native resources allocated on behalf of an application and for the freeing thereof when the application is unloaded.

Native resource tracking mechanism tables (hereinafter, "handle tables") for associating various different native resources with a specific application are provided. When an applications or a component thereof requests a native resource, a handle in a native resource handle table is created for the requested native resource when it is allocated to the domain of the application. Each handle table, and handle therein, can be a memory allocation. The handle in the native resource handle table is used to track the requested native resource and to associate it with a domain of the application. When so associated, in a tear down routine of the domain application, implementations provide a routine to traverse the handles in the native resource handle tables and free any native resource that has not already been freed from the terminating domain of the application to which the native resource had been allocated. As such, where a developer has not provided code in a shut down routine for a domain of an application to that will release native resources that were allocated to the domain of the application, an automatic freeing routine for the allocated native resources is executed when the domain of the application is terminated. Accordingly, the common development problem of developers not coding so as to free an allocated native resource when the coded application is done using the native resource has been overcome. The problem is overcome by the provision of a tracking mechanism system (hereinafter, "handle system") to do the release rather than relying on the developers' code to release allocated native resources that are no longer being used. As such, there can be an automatic release of allocated memory allocation with each release of an unused native resource.

Implementations include an execution engine of a virtual machine that processes intermediate code to execute an application. The execution engine can exist on a variety of operating systems, each of which may or may not have virtual memory. The execution of the application creates a domain of the application. The domain of the application, in a virtual machine environment, is an isolation abstraction for each application in its domain. The executing application can initiate a request for the allocation of a native resource to the domain of the application. When the executing application requests a native resource, which usually occurs through operation of a library member of a class library, an allocation and collection routine is performed.

The allocation and collection routine includes several steps. One step is an inquiry into whether there is a handle in a native resource handle table that is available to associate with the native resource that has been requested for allocation. If a handle for the requested native resource cannot be allocated, then a collection routine is invoked. The collection routine is a type of garbage collection procedure that attempts to free each object in a handle of the native resource handle table that is no longer referenced by a domain of an application. Any such object may hold a reference to a native resource. When the object is freed, the handle for the referenced native resource will also be freed. When the previously allocated native resource is freed, it can be made available to for reallocation to a domain of a requesting application.

If performing the collection routine does not result in a handle in a native resource handle table being made available for an allocation of the requested native resource, then a diagnostic routine is performed to inform the member of the framework class library that called for the allocation of the native resource of an allocation failure. The diagnostic routine provides a notification to the effect that there are no resources available for allocation to fulfill the request.

If a performance of the collection routine results in a handle in a native resource handle table being made available for an allocation of the requested native resource, then the requested native resource is allocated to the domain of the requesting application and a handle in an entry in a native resource handle table is attached to the name and address of the native resource. Then, the call from the member of the class library that called for the allocation is processed so as to return to the application an object that contains a reference to the allocated native resource. The executing application, or component thereof, may then use the allocated native resource.

Once the use of an allocated native resource has been completed by the executing application, implementations provide a deterministic freeing of the native resource when the domain of the application is torn down. This can occur when the application is exited by a user, when the computing machine in which the application executes is powered down, when an unhandled exception occurs, etc. Implementations provide that, when the domain of the application being shut done is unloaded, all the native resources that have been allocated to the terminating domain of the application are freed. The process for doing so, as provided by the implementations, operates by use of the native resource handle tables. When an unload routine is performed for the domain of the application that is being shut down, the native resource handle tables are searched to locate each handle in each native resource handle table that has been associated with the domain of the application. The native source attached to each such handle is freed and the handle is returned to a pool of handles for future use.

Other implementations provide native resource management techniques by which allocated native resources can be allocated only under specific circumstances that take security issues into consideration. One such technique provides a policy that specifies system parameters that can be used in an attempt to free previously allocated native resources. The policy can dictate that, for all applications not identified in a predetermined list of providers, any such application making a request for the allocation of native resources will have a predetermined limitation as to the type and number thereof that will be allocated. By way of example and not by way of limitation, when an application from a provider not in the predetermined list has been allocated a predetermined number of sockets, no additional sockets are allocated and no handle in a native resource handle table will contain a new reference to allocated socket unless an execution of the collector routine frees up one of more previously allocated sockets that are no longer being used by an application.

Implementations can be made in the general context of computer-executable instructions, such as program modules, being executed by a computer or like device, which, for example, may take the form of a personal computer (PC), a workstation, a portable computer, a server, a plurality of processors, a mainframe computer, etc. Implementations that provide noticeably increased efficiency and speed include those in resource constrained systems such as wireless communications base stations, hand-held communications devices such as cellular telephones, streamed media players, set-top boxes, etc.

FIG. 1 shows an implementation that illustrates a computer environment 100 utilizing a virtual machine (VM) 104 having an architecture to run on different platforms. VM 104 is stacked on an interface 110 between a managed code portion and a native code portion. According, interface 110 can be an interface to different operating systems and different applications. The managed code portion includes VM 104 and App (k) 102 in user code that include the applications 102(1), 102(2), 102(3), 102(4), . . . , 102(K). Each application 102(k) can be coded in a variety of different programming languages.

As indicated in FIG. 1, each App (k) 102 can have one or more objects or Obj (i) associated therewith. System parameter calls are generated by any of App (k) 102, or component thereof (e.g., by user input or program libraries). These system parameter calls, which represent requests for access to and/or use of a native resource, are transmitted to a base class library (BCL) 106 of the managed code portion. BCL 106 is included in VM 104. BCL 106, which can include a managed drawing library and a managed windowing library (e.g. a GUI library), has library members. Each library member can initiate a call for a native resource for App (k) 102. In another implementation, the BCL 106 can include a graphic user interface (GUI) code library. The GUI code library can be coded in byte code language which is an intermediate language between the language of the App (k) 102 and that of the native code portion. BCL 106 largely determines the characteristics of the interaction between the user and the computer environment 100, and also determines the types of experience that the user will have when using any particular App (k) 102. In one implementation BCL 106 includes one or more library members that can initiate the transition of a call for a native resource on behalf of an App (k) 102 across the interface 110 between the native code portion and the managed code portion.

The native resource called for by the library member of BCL 106 can be a UI resource such as for drawing and windowing management and/or for a pointing device such as a mouse, a cursor controller, a joy stick, a keyboard, etc. The term "drawing management" refers to programs and processes (e.g., software and/or firmware) such as drafting, font, painting, graphics, etc. that allow users to generate and/or manipulate displayed objects via calls to UI resource libraries.

The native resource called for by a library member of the BCL 106 can also be a socket for networking, transmission and receiving. File and data management library members can also be included in BCL 106 for the calling of native resources associated with data reading, writing, and storage.

One or more native resource collection and allocation modules 108 are included in VM 104. An allocation module in 108 is executed in the managed code portion for allocating native resources to be used by any of Applications 102(1), 102(2), 102(3), 102(4), . . . , 102(K) as they are called by library members of BCL 106. At some point after each App (k) 102 has used the respective native resource allocated thereto, a collection module of 108 is executed in the managed code portion to collect the respective native resources for further allocation and use by still another App (k) 102.

In the native code portion of computer environment 100 are situated an operating system (OS) 726 interfacing hardware 702, an execution engine 112 for VM 104, and native resource handle tables 114 for the native resources used by any of applications 102(1), 102(2), 102(3), 102(4), . . . , 102(K). Hardware 702, discussed below, is provided for core services including sockets for networking, synchronization primitives, threading, timers, file stream objects, display devices, etc.

Figure 2:
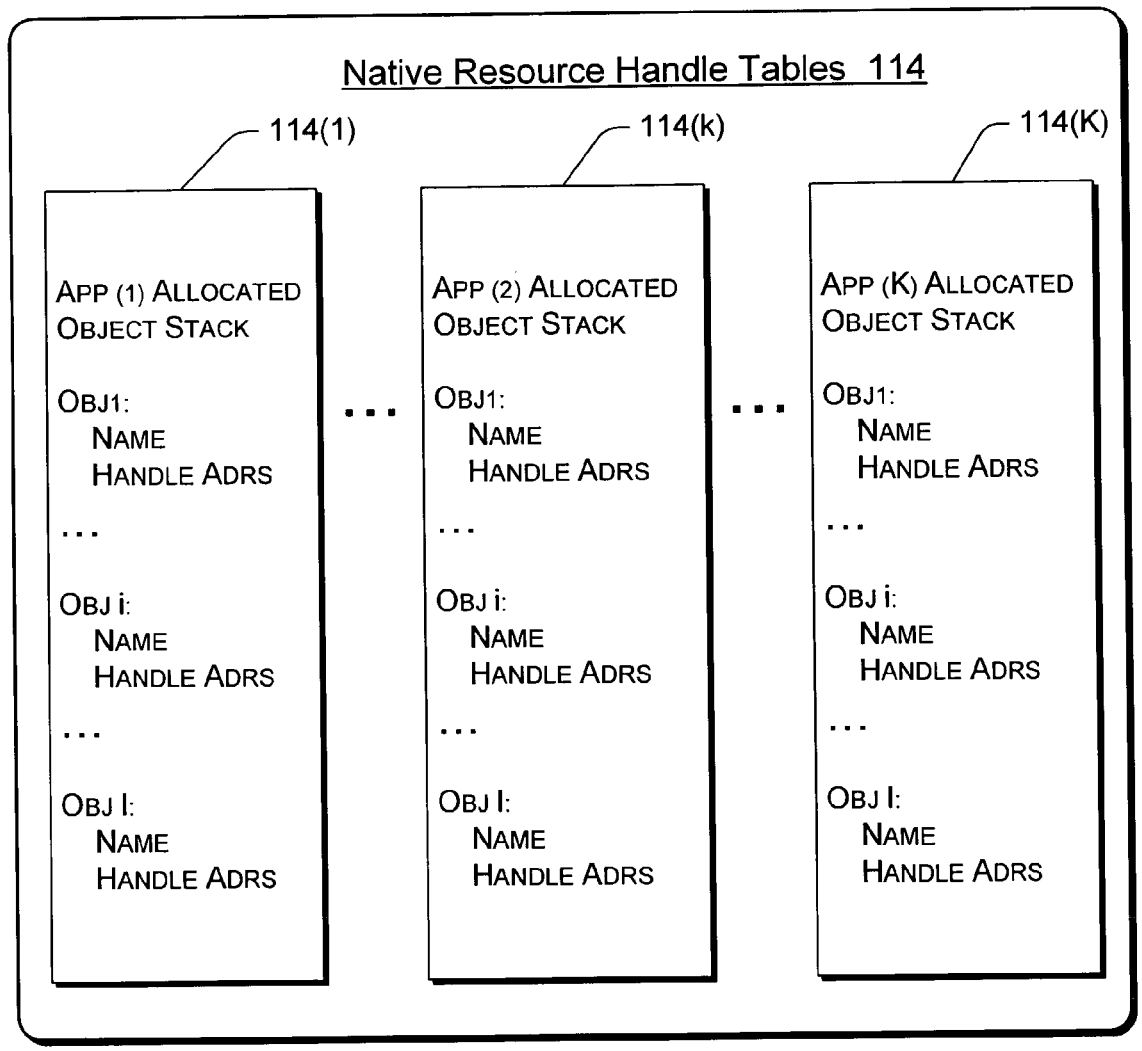
FIG. 2 illustrates one embodiment of a plurality of native resource handle tables each having one or more allocated object stacks associated an application.

The native resource handle tables 114 seen in the native code portion of FIG. 1 are further illustrated by way of another implementation thereof seen in FIG. 2. Each native resource handle table (k) 114 in FIG. 2 corresponds to one App (k). Thus, native resource handle tables (1-K) 114 are for respective Apps (1-K). Each App (k) in FIG. 2 corresponds to one App (k) 102 in FIG. 1. One of more objects (Obj (i)) are included in each native resource handle table (k) 114. Each Obj (i) represents a handle to a native resource in an allocated object stack. Each handle includes a name and an address of the native resource in the allocated object stack. An execution of the allocation module of the Resource Allocator and Collector Modules 108 is called to perform allocation of native resources to corresponding App (k) and Obj (i) in native resource handle table (k) 114.

Each Obj (i) represents the handle to the native resource that has been allocated to a respective App (k) 102 by a caller from BCL 106 by using a system call made when executing code in the VM environment, where each caller makes a call through to OS 726. When a handle is created for a native resource, the handle is formed as an entry (i) in a native resource handle table (k) 114 that corresponds to App (k). The entry (i) includes the name and address of its corresponding allocated native resource. A handle can be created upon request for an allocated obj (i) if a handle for the corresponding requested native resource is free. When an App (k) executing in the managed code portion of the VM has completed its use of an allocated native resource, it is desirable that the native resource be freed so that it can be allocated to another application or a component thereof. To do so, the collection module of the Resource Allocator and Collector Modules 108 is called to perform a routine that frees the native resource from entry (i) in native resource handle table (k) 114. Any memory associated with the native resource is also freed. After the handle has been freed, native resource handle table 114 can be compacted and the free memory can be returned for future system-wide use.

Figure 3:
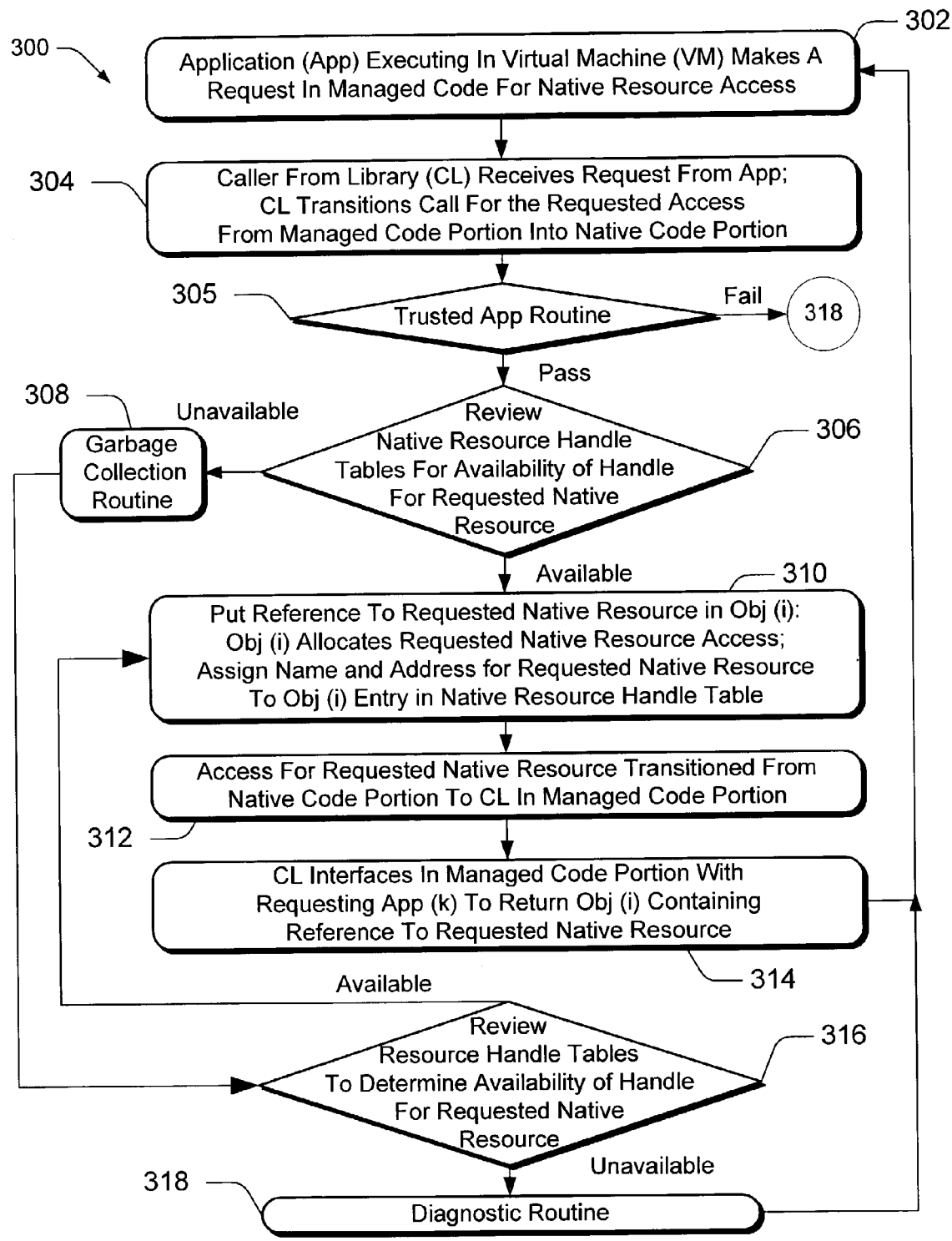
FIG. 3 illustrates a flow chart of one implementation of a method for native resource collection and allocation that may be performed in the computer environment shown in FIG. 1 using the native resource handle tables shown in FIG. 2.

Referring now to FIG. 3, a method 300 is illustrated by a flow chart. The flow chart depicts one implementation for an allocation of a native resource in response to a request from an application. In the following description of method 300, reference will be made to FIGS. 1–2.

Method 300 begins at block 302 where an application (App (k)) is executing in a virtual machine (VM) environment. The App (k), or a component thereof, performs a request in the managed code portion for access to a native resource. The request at block 302 initiates a call at block 304. In the call, a caller from a library (CL) receives the request from the App (k). By way of example of the CL, when executing code in the managed code portion (i.e., the VM environment), the members of the BCL 106 use system parameter calls to perform low level functionality (e.g. drawing and windowing management). The CL then transitions the call for the requested access to the native resource from the managed code portion into the native code portion. By way of reference to FIG. 1, the interface 110 is an exemplary boundary where a call is transitioned between the managed and native code portions. Following the transition of the call, method 300 passes control to block 305 where a trusted App routine is performed to determine whether the call to establish access of the App (k) to the native resource should be granted. Implementations of trust App routines are discussed below in reference to FIG. 4. If the trusted App routine fails, method 300 moves to block 318 where a diagnostic routine is performed. The diagnostic routine can pass a diagnostic to a domain of App (k). The diagnostic is passed App (k) through the caller from the CL. A message can be conveyed by the diagnostic that the requested native resource could not be allocated.

If the trusted App routine passes at block 305, method 300 moves to block 306 for a query. The query conducts a review of the native resource handle tables 114, such as have been illustrated in FIG. 2 and described above. The review of the native resource handle tables 114 makes a determination as to whether a handle is available for the native resource requested by the App (k) or a component thereof. If the handle is available, method 300 passes control to block 310. If the determination finds that a handle is unavailable, then method 300 moves to block 308 for the performance of a garbage collection routine. Implementations of garbage collection routines are discussed below with respect to FIG. 6. If the execution of the garbage collection routine at block 308 is able to free up the requested native resource and a handle therefore in a native resource handle table, as determined by the further query thereof at block 316, then method 300 moved to block 310. Otherwise, method 300 moves to block 318 for a performance of the diagnostic routine discussed above.

At block 310, method 300 performs steps. One step is to put an Obj (i) in the $i^{th}$ entry of native resource handle table (k) that references the native resource that was requested by the App (k) or a component thereof. In another step, the Obj (i) in the $i^{th}$ entry of native resource handle table (k) allocates the access to the native resource requested by App (k). The name and the address of the native resource to which access has been allocated are inserted into the $i^{th}$ entry of native resource handle table (k).

After block 308, method 300 passes control to block 312 where access for requested native resource is transitioned across the interface 110 from the native code portion to the CL in the managed code portion. At block 314, the CL interfaces in the managed code portion with App (k) to return thereto the Obj (i) that contains a reference to the requested native resource. As such, the requested native resource (e.g. a UI resource for drawing and/or windowing management) within the native code portion is allocated based on the one or more system parameter calls from the CL. Method 300 then returns to block 302.

Method 300 has been described in the context of a virtual machine environment. The native resource allocation and collection disclosed herein is also applicable to applications in native code that execute in a native machine environment.

FIG. 4 provides one implementation of a trusted source routine that is generally described above with respect block 305 of FIG. 3. The implementation of FIG. 4 illustrates a method 400 that initiates an exemplary trusted application (App) routine at block 402. Method 400 transfers control to block 404 where a query is performed as to whether the provider of the App can be identified on a predetermined list of providers. If so, then a "pass" finding is the result of the trusted App routine and method 400 exits at block 406. Otherwise, method 400 passes control to block 408 where a secondary query is made.

The secondary query at block 408 examines the application making a request for the allocation of native resources with respect to one or more predetermined limitations on the type and/or number of requested native resources. By way of example and not by way of limitation, if the requesting application has already been allocated the maximum number of sockets as per a predetermined limit, method 400 may give a "fail" result and pass control to block 410. In an alternative implementation, method 400 can call a garbage collection routine at block 410. Unless an allocated socket referenced in a handle of a native resource handle table can be freed by the garbage collection routine, the alternative implementation of method 400 will yield a failure result. If a socket was freed by the garbage collection routine, then the allocation is made to the requesting App (k) and method 400 passes control to block 408 for a "pass" result. The trust App routine provides security against applications from unknown providers that would inadvertently or maliciously take over all or most of the native resources of a computing environment.

An App (k), or a component thereof, goes through a process when being shut down (e.g. App (k) is finishing, terminating, ending, being exited by a user, the computing machine in which App(k) executing is being powered down, an unhandled exception is occurring App(k)). Implementations provide that the unloading of the domain of App (k) will include a garbage collection routine by which all of the native resources that have been allocated to App (k) are automatically freed. One such implementation of a garbage collection routine is illustrated by a method 500 depicted in FIG. 5 that begins at block 502 where an application (App) is initiated and executes in a virtual machine (VM) environment. Method 500, however, is also applicable to applications that execute in a native machine environment. Following block 502, control of method 500 passes to block 504 where a component of the App initiates and executes. If the execution of the component of the App is complete at block 506, which can be an exiting, ending, normal or abnormal termination thereof, then a garbage collection routine 508 follows block 506 and method 500 passes control back to block 504. Otherwise, method 400 passes control to block 510. At block 510, a query is made as to whether execution of the App is complete, which can be an exiting, ending, normal or abnormal termination thereof. If so, then a garbage collection routine 512 follows block 510 and method 500 passes control back to block 502. Otherwise, method 500 passes control back to block 504. The garbage collection routines 508, 512 in method 500 can include similar or different process steps yet have a common result of the location and releasing of native resources that are no longer needed by an App (k) or component thereof.

Figure 6:
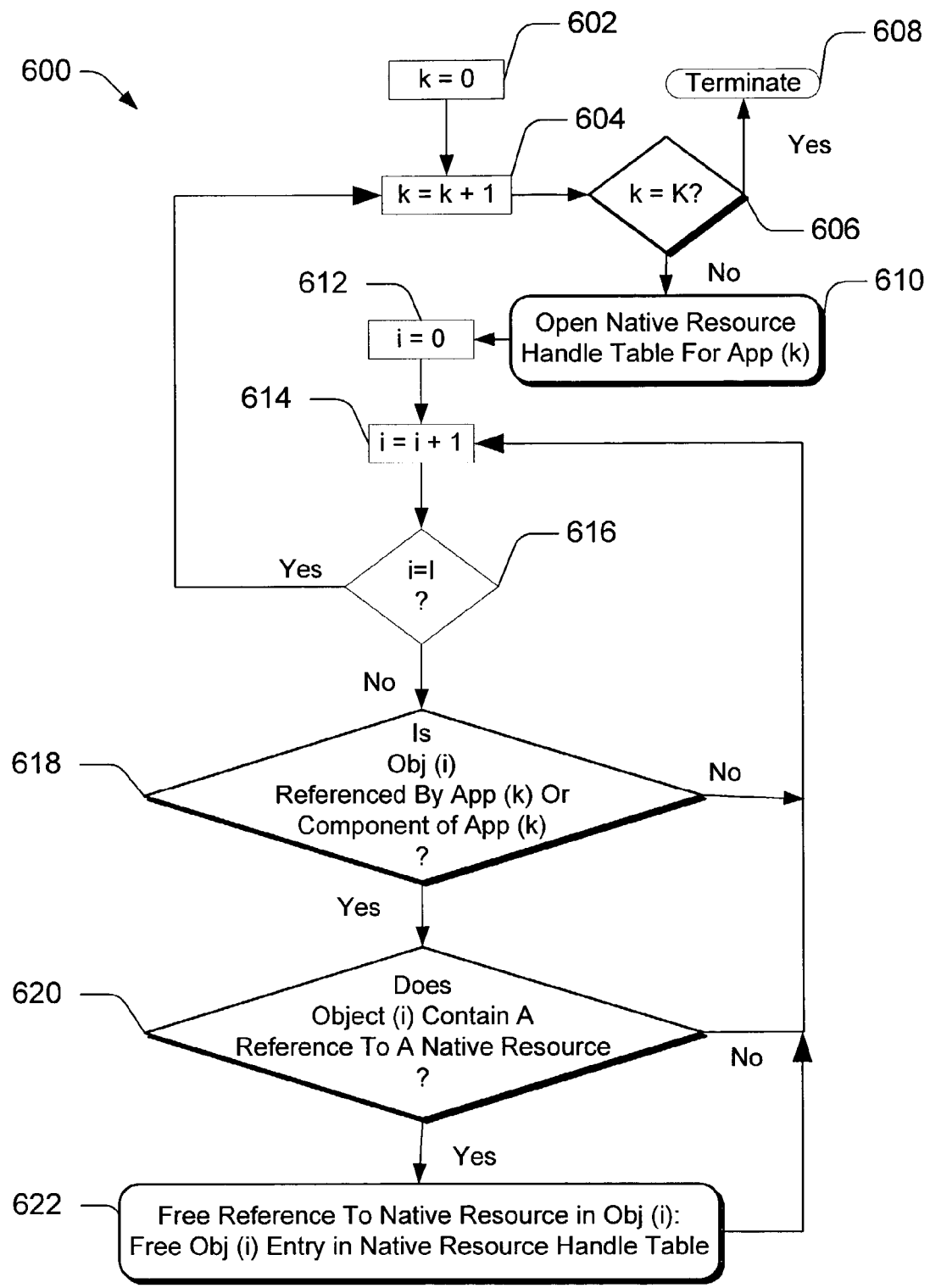
FIG. 6 illustrates a flow chart of one implementation of a method for reviewing table entries in native resource handle tables to determine if any table entry references an object and to determine whether the referenced object refers to a native resource, in which case the reference to the native resource in the table entry is freed as is the table entry.

In reference to the native resource handle tables 114 illustrated in FIG. 2 and described above, an implementation of a garbage collection routine is illustrated in FIG. 6 by a method 600. The garbage collection routine of method 600 can be implemented with respect to any of block 308 in FIG. 3, block 408 of FIG. 4, and blocks 512, 508 of FIG. 5. Method 600 includes a review of entry (i) in native resource handle table (k) that is associated with App (k), where i=(1 to I) and k=(1 to K). The review determines if any table entry (i) references an object (obj (i)) and whether the referenced obj (i) refers to a native resource. If so, then both the $i^{th}$ table entry and the reference to the native resource in the $i^{th}$ table entry are freed. Method 600 begins at block 602 where 'k' is initialized to zero. Method 600 moves to block 604 where 'k' is incremented. A query as to whether 'k' has reached its limit is made at block 606. If so, then method 600 terminates at block 608. If not, then control of method 600 passes to block 610.

The native resource handle table (k) associated with App (k) is opened at block 610 and 'i' is initialized at block 612. Method 600 moves to block 614 where 'i' is incremented. A query as to whether 'i' has reached its limit is made at block 616. If so, then method 600 returns to block 604. If not, then control of method 600 passes to block 618 where another query is made. The query at block 618 is whether the $i^{th}$ entry in native resource handle table (k) has an Obj (i) that is referenced by App (k) or that is referenced by a component of App (k). If not, then control of method 600 returns to block 614. Otherwise, method 600 passes control to block 620 where a still further query is made as to whether Obj (i) in the $i^{th}$ entry of native resource handle table (k) contains a reference to a native resource. If not, then control of method 600 returns to block 614. Otherwise, the reference to the native resource in Obj (i) in the $i^{th}$ entry of native resource handle table (k) is freed. The $i^{th}$ entry for Obj (i) in native resource handle table (k) is also freed. After block 622, method 600 returns control to block 614.

Though the concepts described here are applicable to computing environment 100 as depicted in FIG. 1, in general including laptops, personal computers, networks, mainframes, etc., they are especially beneficial to such resource constrained devices (that have a relatively small processor and/or memory) as personal digital assistants (PDAs), cellular telephones, computer devices, embedded devices, microprocessor devices, and microcomputer devices. To provide some scale, such resource constrained devices are less than $\frac{1}{20}^{th}$ of size of many desktop or laptop computers (and often less than $\frac{1}{60}^{th}$). The relatively small size, and somewhat simplified operation, of the resource constrained devices dictate that the designers program effectively and in a manner that complies with platform guidelines.

The managed and native code portions having interface 110 there between contribute to a managed execution process for the programs controlling native resources, such as the UI resources for drawing programs. The native code portion compiles for the OS 726 directly. As such, the native code portion codes in such native computer languages as C, C++, Basic, etc. which the OS can handle. The native code portion may also contains such features, for example, as a just in time (JIT) compiler, a class loader, and/or an interpreter.

Often, software developers wish to allow users to have access to native resources to make the software useful and practical. One such access is an access to a collection of UI resources involves UI libraries that give users the ability to draw objects, bar charts, figures, etc. using drawing resources. In drawing programs, drawing resources draw using drawing primitives such as lines, rectangles, etc. Drawing resources such as pens or brushes each have drawing parameters that may include one or more of color, weight, style, and gradient. The drawing resource parameters relating to text include, for example, color, font, size, and style. The UI libraries are found in the BCL 106 and commonly call code using system codes from the managed code portion through to the native code portion and to the operating system. Such system codes can be used to perform relatively low level functionality as drawing and windowing management.

The identity of certain VMs 104 is evident from the output. For example, when a Java applet runs, a skilled user or developer can positively identify it as a Java applet. Other embodiments of VMs, by comparison, are seamless and consistent with the native device application. A pocket PC application running on the same VM 104 therefore looks and feels differently from a smart phone application or an embedded controller application. As such, the appearance and characteristics of each application that runs on each respective OS 726 is primarily determined by the developer of that particular application, and not the particular VM. Each application looks and feels like the application as developed by the developer for the OS 726.

The App (k) 102 is typically programmed by a code developer to provide the functionality of the computer environment 100. The developer typically programs the code for the application, and has the program compiled, loaded, and linked to create the executable file (.exe) for the application. The .exe file is executed by the user of the computer environment 100 to run the application, and therefore causes the application to perform as desired by the user.

Greater interoperability between networked computer devices and/or environments enhances the user's and developer's experience of programs calling for native resources, such as UI resources including drawing programs, and increase the acceptance of such programs that run on stand-alone computers and on such networks as the Internet, intranets, local area networks (LAN), and wide area networks (WAN). The computer environment 100 generally allows for such interoperability for many different networked computer devices such as personal computers, telephones, workstations, PDAs, embedded controller devices, etc. that have different operating systems and do not necessarily communicate or interface well. Additionally, the computer environment 100 effectively displays data originating from different programs, such as drawing programs, which run on the same, or different, computers. As such, much of the data prepared by one application or operating system and then processed and/or stored by many network servers can be considered "images" which should be able to be effectively used by another application or OS.

Implementations described and illustrated in this disclosure are intended to streamline the computer processing, and therefore provide efficiency in the allocation and management of native resources, including bur not limited to UI resources related to OS resources. Some such implementations are especially suited to resource constrained devices. Even with the more powerful computers, though, it would still be desirable to follow good programming techniques to accomplish faster and more reliable applications, thereby increasing the user's enjoyment and use of such applications. Implementations of a managed execution process that is performed by the managed code portion and the native code portion as shown in FIG. 1 follows these guidelines:

A. Choose a compiler to associate with the App (k) 102. To obtain the benefits provided by a common language runtime, a developer can select one or more language compilers that target the runtime.

B. Compile the code to an intermediate language code (e.g. the "MSIL" of the Microsoft Corporation intermediate language for NET). This compiling translates the source code, XML, or other application into the intermediate language, and also generates associated metadata. The intermediate language is a CPU-independent set of instructions that can be efficiently converted to the native code to ease the transition of data across the interface 110 between the managed code portion and the native code portion. The intermediate language includes instructions for loading, storing, initializing, and calling methods on objects, as well as instructions for arithmetic and logical operations, control flow, direct memory access, exception handling, and other operations. The metadata describes such parameters as the types in the code, including the definition of each type, the signatures of each type's members, the members that the code references, and the data that the runtime uses at execution time.

C. Compile the intermediate level code into native code. The native code portion creates a system or native resource from a managed assembly and installs it into the native code portion on the local computer. A native resource that is a file containing compiled processor-specific machine code is produced. The actual system resource resides in the OS 726.

In implementations of VM 104, at execution time, a just-in-time (JIT) compiler associated with the VM 104 in the native code portion translates the intermediate language into the native code. During this compilation, the code passes a verification process that examines the intermediate language code and metadata to find out whether the code can be determined to be type safe. Before the intermediate language can be executed, it must be converted by the JIT compiler of the VM 104 to the native code. The native code is a CPU-specific code that runs on the same computer architecture as the JIT compiler of the VM 104. Developers can write a set of instructions for the intermediate level language that can be JIT-compiled and executed on computers with different architectures. The managed code will run only on a specific operating system if it calls platform-specific, native APIs, or a platform-specific class library.

D. Execute the code. The common language runtime provides the infrastructure that enables the code execution (as well as a variety of services that can be used during execution) to take place. During execution, the OS UI resources are displayed on the UI (e.g. a touch sensitive screen) which can respond to user input. As such, user input with a pointing device of the computer environment 100 is mirrored by motion of the OS native resource across the UI. Before a process can be executed by the computer environment 100, it must be compiled to processor-specific code. Each process for which the intermediate language has been generated is JIT-compiled when it is called with a system parameter call for the first time, and then executed. The next time the process is executed, the existing JIT-compiled native code is executed. The process of JIT-compiling and then executing the code is repeated until execution is complete.

E. During execution, managed code receives services such as automatic memory management, security, interoperability with unmanaged code, cross-language debugging support, and enhanced deployment and versioning support. After a native draw resource is generated for an assembly program, the runtime automatically attempts to locate and use this native image each time it runs the assembly. If it is unable to find a suitable native image, the runtime reverts to a standard compiled program.

In a network environment, including the computing environment seen in FIG. 1 and the remote computer 748 as described later relative to FIG. 7, each one of the plurality of computers that form the computer environment 100 may be running different applications and operating systems, and may have different capabilities and purposes. The VM 104 has the capability of interfacing with a plurality of computers simultaneously to affect such networked activities as parallel processing with what appears to the user of the VM 104 as a non-networked computer environment.

Exemplary Computer Environment

Figure 7:
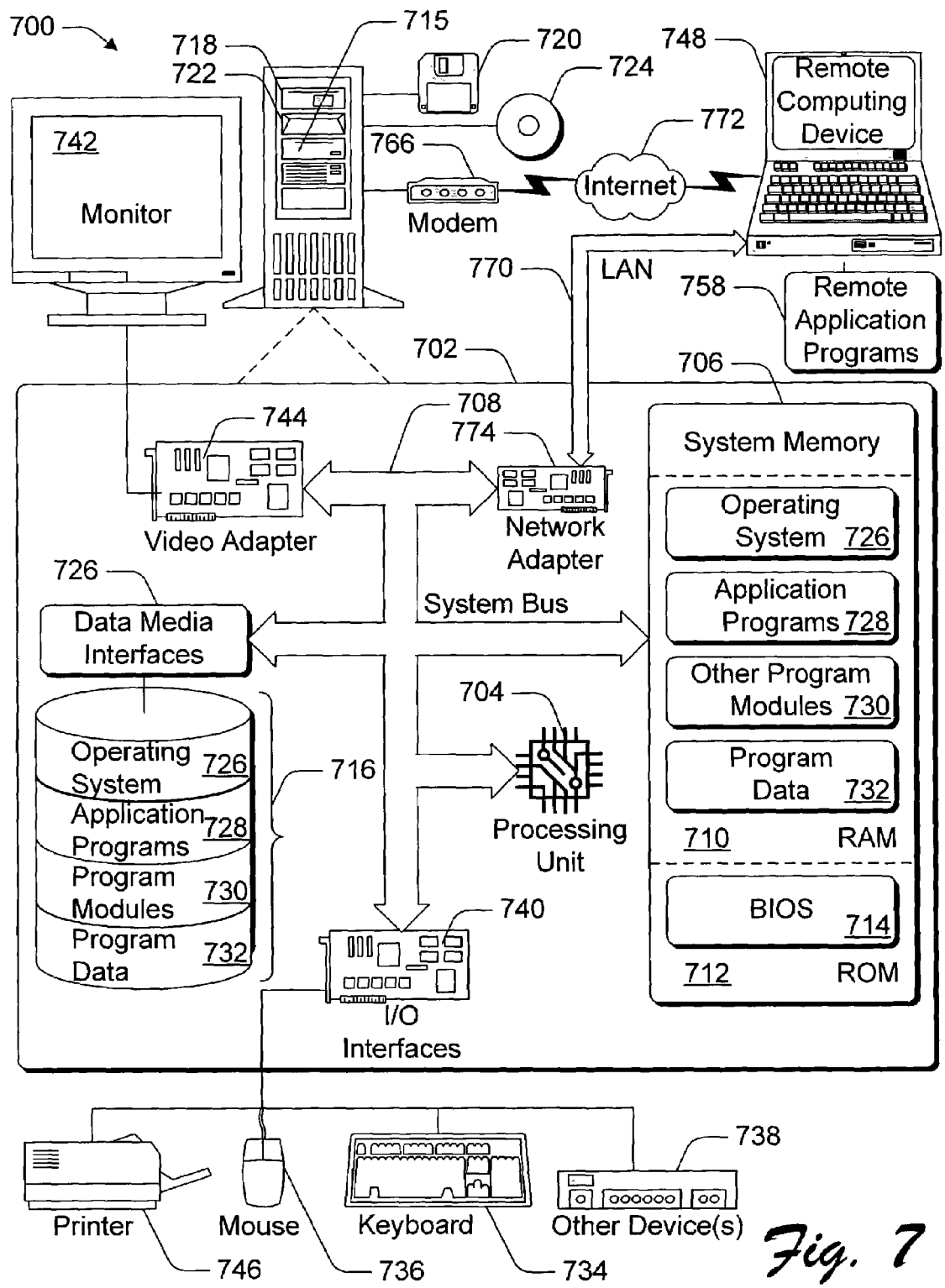
FIG. 7 illustrates a block diagram of the components of an exemplary computer associated with one embodiment of a computer environment shown in FIG. 1 that may execute all or part of the method of FIG. 3.

FIG. 7 illustrates an example of a suitable computing environment 700 within which implementations described herein may be implemented (either fully or partially). Computing environment 700 is intended to represent well known computing systems, environments, and/or configurations that may be suitable for use with the implementations disclosed herein and include, but are not limited to, personal computers, server computers, multiprocessor systems, microprocessor-based systems, network PCs, minicomputers, mainframe computers, distributed computing environments that include any of the above systems or devices, and so on.

The computing environment 700 may be utilized in the computer and network architectures of the implementations described herein. The exemplary computing environment 700 is only one example of a computing environment and is not intended to suggest any limitation as to the scope of use or functionality of the computer and network architectures. Neither should the computing environment 700 be interpreted as having any dependency or requirement relating to any one or combination of components illustrated in the exemplary computing environment 700.

The computing environment 700 includes a general-purpose computing device in the form of a computer 702. The components of computer 702 can include, by are not limited to, one or more processors or processing units 704, a system memory 706, and a system bus 708 that couples various system components including the processor 704 to the system memory 706.

The system bus 708 represents one or more of several possible types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 702 typically includes a variety of computer readable media. Such media can be any available media that is accessible by computer 702 and includes both volatile and non-volatile media, removable and non-removable media.

The system memory 706 includes computer readable media in the form of volatile memory, such as random access memory (RAM) 710, and/or non-volatile memory, such as read only memory (ROM) 712. A basic input/output system (BIOS) 714, containing the basic routines that help to transfer information between elements within computer 702, such as during start-up, is stored in ROM 712. RAM 710 typically contains data and/or program modules that are immediately accessible to and/or presently operated on by the processing unit 704.

Computer 702 may also include other removable/non-removable, volatile/non-volatile computer storage media. By way of example, FIG. 7 illustrates a hard disk drive 716 for reading from and writing to a non-removable, non-volatile magnetic media (not shown), a magnetic disk drive 718 for reading from and writing to a removable, non-volatile magnetic disk 720 (e.g., a "floppy disk"), and an optical disk drive 722 for reading from and/or writing to a removable, non-volatile optical disk 724 such as a CD-ROM, DVD-ROM, or other optical media. The hard disk drive 716, magnetic disk drive 718, and optical disk drive 722 are each connected to the system bus 708 by one or more data media interfaces 726. Alternatively, the hard disk drive 716, magnetic disk drive 718, and optical disk drive 722 can be connected to the system bus 708 by one or more interfaces (not shown).

The disk drives and their associated computer-readable media provide non-volatile storage of computer readable instructions, data structures, program modules, and other data for computer 702. Although the example illustrates a hard disk 716, a removable magnetic disk 720, and a removable optical disk 724, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 716, magnetic disk 720, optical disk 724, ROM 712, and/or RAM 710, including by way of example, an operating system 726, one or more application programs 728, other program modules 730, and program data 732. Each of the operating system 726, one or more application programs 728, other program modules 730, and program data 732 (or some combination thereof) may include elements of the programming framework 132.

A user can enter commands and information into computer 502 via input devices such as a keyboard 734 and a pointing device 736 (e.g., a "mouse"). Other input devices 738 (not shown specifically) may include a microphone, joystick, game pad, satellite dish, serial port, scanner, and/or the like. These and other input devices are connected to the processing unit 704 via input/output interfaces 450 that are coupled to the system bus 708, but may be connected by other interface and bus structures, such as a parallel port, game port, or a universal serial bus (USB).

A monitor 742 or other type of display device can also be connected to the system bus 708 via an interface, such as a video adapter 744. In addition to the monitor 742, other output peripheral devices can include components such as speakers (not shown) and a printer 746 which can be connected to computer 702 via the input/output interfaces 740.

Computer 702 can operate in a networked environment using logical connections to one or more remote computers, such as a remote computing device 748. By way of example, the remote computing device 748 can be a personal computer, portable computer, a server, a router, a network computer, a peer device or other common network node, and so on. The remote computing device 748 is illustrated as a portable computer that can include many or all of the elements and features described herein relative to computer 702.

Logical connections between computer 702 and the remote computer 748 are depicted as a local area network (LAN) 750 and a general wide area network (WAN) 752. Such networking environments are commonplace in offices, enterprise-wide computer networks, intranets, and the Internet.

When implemented in a LAN networking environment, the computer 702 is connected to a local network 750 via a network interface or adapter 754. When implemented in a WAN networking environment, the computer 702 typically includes a modem 756 or other means for establishing communications over the wide network 752. The modem 756, which can be internal or external to computer 702, can be connected to the system bus 708 via the input/output interfaces 740 or other appropriate mechanisms. It is to be appreciated that the illustrated network connections are exemplary and that other means of establishing communication link(s) between the computers 702 and 748 can be employed.

In a networked environment, such as that illustrated with computing environment 700, program modules depicted relative to the computer 702, or portions thereof, may be stored in a remote memory storage device. By way of example, remote application programs 758 reside on a memory device of remote computer 748. For purposes of illustration, application programs and other executable program components such as the operating system are illustrated herein as discrete blocks, although it is recognized that such programs and components reside at various times in different storage components of the computing device 702, and are executed by the data processor(s) of the computer.

Computer readable media can be any available media that can be accessed by a computer. By way of example, and not limitation, computer readable media may comprise "computer storage media" and "communications media." "Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
   requesting a native resource with an application;
   creating a memory allocation containing an object that references the application and a name and an address of the native resource;
   returning the object to the application for use of the native resource;
   automatically checking the application to determine if the native resource can be released;
   creating a plurality of memory allocations corresponding to a plurality of native resources allocated in response to a respective plurality of requests from one or more said applications, wherein each said memory allocation contains an object that references one said application and that includes the name and address of one said native resource;
   wherein the creating a plurality of memory allocations further comprises, prior to creating each said memory allocation:
   determining that the memory allocation cannot be created by determining that the native resource requested by the application is unavailable;
   reviewing each said memory allocation that was previously created to determine if the application referenced by the object of the memory allocation is no longer using the native resource named in the object of the memory allocation;
   for each said native resource determined to be no longer used, removing the memory allocation containing the object that includes the name of the native resource determined to be no longer used to thereby release the native resource; and,
   when a released said native resource corresponds to the native resource determined to be unavailable, creating a memory allocation containing an object that references the requesting said application and that includes the name and address of the released said native resource.

2. The method as defined in claim 1, wherein the returning the object to the application provides the application with access to and use of the native resource.

3. The method as defined in claim 1, wherein:
   the requesting a native resource with an application occurs in a managed code portion of a computer environment; and
   the creating a memory allocation occurs in a native code portion of a computer environment.

4. The method as defined in claim 3, wherein the computer environment comprises:

in the managed code portion:
   the application in user code; and
   a virtual machine;
   in the native code portion:
   a virtual machine execution engine;
   the memory allocation; and
   an operating system.

5. The method as defined in claim 1, wherein the requesting a native resource with an application further comprising requesting the native resource with a component of the application.

6. The method as defined in claim 1, further comprising releasing the native resource by:
   identifying the memory allocation containing the object that references the application; and
   when the name and address of the native resource to be released is contained in the object that references the application, removing the memory allocation to release the native resource.

7. The method as defined in claim 1, further comprising, when terminating one said application, removing each said memory allocation identified as containing an object that references the application to thereby release the native resource named in the object of the memory allocation so identified.

8. The method as defined in claim 1, further comprising a plurality of memory allocation tables each containing one or more said objects referencing one said application.

9. The method as defined in claim 1, further comprising, for each termination of each said application:
   identifying each said memory allocation containing an object that references the application; and
   removing each said identified memory allocation to release the native resource for which the name and address thereof is contained in the object.

10. The method as defined in claim 1, wherein the creating a plurality of memory allocations further comprises, prior to creating each said memory allocation:
    reviewing each said memory allocation that was previously created to determine if the application referenced by the object of the memory allocation is no longer using the native resource contained in the object of the memory allocation; and
    for each said native resource determined to be no longer used, removing the memory allocation containing the object that includes the name of the native resource determined to be no longer used to thereby release the native resource.

11. The method as defined in claim 1, wherein the determining that the native resource requested by the application is unavailable comprises determining that a predetermined number is exceeded by a count of the number of the memory allocations that contain an object that names one of the native resources that:
    is of like kind to the native resource requested by the application; and
    is still being used by the application referenced by the object.

12. A computer readable storage medium having computer instructions thereon that, where executed by a computer, perform acts comprising:
    requesting a native resource with an application;
    creating a memory allocation containing an object that references the application and a name and an address of the native resource;
    returning the object to the application for use of the native resource;

automatically checking the application to determine if the native resource can be released;
creating a plurality of memory allocations corresponding to a plurality of native resources allocated in response to a respective plurality of requests from one or more said applications, wherein each said memory allocation contains an object that references one said application and that includes the name and address of one said native resource;
  wherein the creating a plurality of memory allocations further comprises, prior to creating each said memory allocation:
    determining that the memory allocation cannot be created by determining that the native resource requested by the application is unavailable;
    reviewing each said memory allocation that was previously created to determine if the application referenced by the object of the memory allocation is no longer using the native resource named in the object of the memory allocation;
    for each said native resource determined to be no longer used, removing the memory allocation containing the object that includes the name of the native resource determined to be no longer used to thereby release the native resource; and,
    when a released said native resource corresponds to the native resource determined to be unavailable, creating a memory allocation containing an object that references the requesting said application and that includes the name and address of the released said native resource.

13. A method comprising:
requesting a native resource with an application;
receiving the request and calling for the native resource with a library member;
allocating the native resource by:
  creating a handle containing an object that references the application;
  inputting a name and an address of the native resource in the object in the created handle;
returning the object to the calling library member;
returning the object to the application from the calling library member;
automatically checking the application to determine if the native resource can be released;
creating a plurality of handles corresponding to a plurality of native resources allocated in response to a respective plurality of requests from one or more said applications, wherein each said handle contains an object that references one said application and that includes the name and address of one said native resource;
  wherein the creating a plurality of handles further comprises, prior to creating each said handle:
    determining that the handle cannot be created by determining that the native resource requested by the application is unavailable;
    reviewing each said handle that was previously created to determine if the application referenced by the object of the handle is no longer using the native resource for which the name and address thereof is contained in the object of the handle and which said native resource had been allocated in response to the request from the application;
    for each said native resource determined to be no longer used, removing the handle containing the object that includes the name and address of the native resource determined to be no longer used to thereby release the native resource;
    when a released said native resource corresponds to the native resource determined to be unavailable, reallocating the released said native resource by:
      creating a handle containing an object that references the requesting said application; and
      inputting the name and address of the released said native resource in the object in the created handle.

14. The method as defined in claim 13, wherein the returning the object to the application from the calling library member enables the application to access and use the native resource.

15. The method as defined in claim 13, wherein:
the requesting a native resource with an application occurs in a managed code portion of a computer environment;
the calling for the native resource with a library member occurs in a managed code portion of a computer environment; and
the allocating the native resource occurs in a native code portion of the computer environment.

16. The method as defined in claim 15, wherein the computer environment comprises:
in the managed code portion:
  the application in user code; and
  a virtual machine;
in the native code portion:
  a virtual machine execution engine;
  the handle; and
  the operating system.

17. The method as defined in claim 13, wherein the requesting a native resource with an application further comprising requesting the native resource with a component of the application.

18. The method as defined in claim 13, further comprising releasing the native resource by:
identifying the handle containing the object that references the application; and
when the name and address of the native resource to be released is contained in the object that references the application, removing the handle to release the native resource.

19. The method as defined in claim 13, further comprising:
creating a plurality of handles corresponding to a plurality of native resources allocated in response to a respective plurality of requests from one or more said applications, wherein each said handle contains an object that references one said application and that includes the name and address of one said native resource.

20. The method as defined in claim 13, further comprising a plurality of handle tables each containing one or more said objects referencing one said application.

21. The method as defined in claim 13, further comprising, for each termination of each said application:
identifying each said handle containing an object that references the application; and
removing each said identified handle to release the native resource for which the name and address thereof is contained in the object.

22. The method as defined in claim 13, wherein the creating a plurality of handles further comprises, prior to creating each said handle:
reviewing each said handle that was previously created to determine if the application referenced by the object of the handle is no longer using the native resource for which the name and address thereof is contained in the object of the handle and which said native resource had been allocated in response to a request from the application;

for each said native resource determined to be no longer used, removing the handle containing the object that includes the name and address of the native resource determined to be no longer used to thereby release the native resource.

23. The method as defined in claim 13, wherein the determining that the native resource requested by the application is unavailable comprises determining that a predetermined number is exceeded by a count of the number of the handles that contain an object that names one of the native resources that:

is of like kind to the native resource requested by the application; and is still being used by the application referenced by the object.

24. The method as defined in claim 13, wherein the handle is an allocation of memory.

25. A computer readable storage medium having computer instructions thereon that, where executed by a computer, perform the method of claim 13.

26. A computer readable storage medium comprising computer executable instructions for performing steps executed in a native code portion of a computer environment, the steps including:

receiving one of more calls each being for a native resource requested by an application;

creating, for each said call, a handle containing an object that references the application and the name and address of the native resource;

sending each said object for delivery to the respective application to enable the application access to and use of the respective native resource;

automatically checking the application to determine if the native resource can be released;

wherein the step of the creating a handle further comprises, prior to creating each said handle:

determining that the handle cannot be created by determining that the native resource requested by the application is unavailable;

reviewing each said handle that was previously created to determine if the application referenced by the object of the handle is no longer using the native resource named in the object of the handle;

for each said native resource determined to be no longer used, removing the handle containing the object that includes the name of the native resource determined to be no longer used to thereby release the native resource; and, when a released said native resource corresponds to the native resource determined to be unavailable, creating a handle containing an object that references the requesting said application and that includes the name and address of the released said native resource.

27. The computer readable storage medium as defined in claim 26, wherein the steps further comprises removing each said handle identified as containing an object that references the application to thereby release the native resource named in the object.

28. The computer readable storage medium as defined in claim 26, wherein a native code portion of the computer environment accesses a plurality of handle tables each containing one or more said objects referencing one said application.

29. The computer readable storage medium as defined in claim 26, wherein the steps further comprise:

identifying each said handle containing an object that references the application; and removing each said identified handle to release the native resource for which the name and address thereof is contained in the object.

30. The computer readable storage medium as defined in claim 26, wherein the step of the creating a handle further comprise, prior to creating each said handle:

reviewing each said handle that was previously created to determine if the application referenced by the object of the handle is no longer using the native resource contained in the object of the handle; and for each said native resource determined to be no longer used, removing the handle containing the object that includes the name of the native resource determined to be no longer used to thereby release the native resource.

31. The computer readable storage medium as defined in claim 26, wherein the step of determining that the native resource requested by the application is unavailable comprises determining that a predetermined number is exceeded by a count of the number of the handles that contain an object that names one of the native resources that:

is of like kind to the native resource requested by the application; and is still being used by the application referenced by the object.

32. A computer readable storage medium having computer executable instructions for performing steps comprising:

requesting a native resource of an operating system from a domain of an application in a managed code portion of a computer environment;

receiving the request and calling for the native resource from a library member in the managed code portion of the computer environment;

receiving the call in a native code portion of the computer environment;

allocating the native resource by:

creating a handle in the native code portion of the computer environment, the handle containing an object that references the domain of the application;

inputting a name and an address of the native resource in the object in the created handle;

returning the object to the calling library member;

returning the object to the domain of the application from the calling library member;

automatically checking the application to determine if the native resource can be release;

creating a plurality of handles corresponding to a plurality of native resources allocated in response to a respective plurality of requests from one or more said domains of the applications, wherein each said handle contains one said object that references one said domain of the application and that includes the name and address of one said native resource, wherein the step of creating a plurality of handles further comprises, prior to creating each said handle:

determining that the handle cannot be created by determining that the native resource requested by the domain of the application is unavailable;

reviewing each said handle that was previously created to determine if the domain of the application referenced by the object of the handle is no longer using the native resource for which the name and address thereof is contained in the object of the handle and which said native resource had been allocated in response to the request from the domain of the application;

for each said native resource determined to be no longer used, removing the handle containing the object that includes the name and address of the native resource determined to be no longer used to thereby release the native resource;

when a released said native resource corresponds to the native resource determined to be unavailable, reallocating the released said native resource by:

creating a handle containing an object that references the requesting said domain of the application; and, inputting the name and address of the released said native resource in the object in the created handle.

33. The computer readable storage medium as defined in claim 32, wherein the step of returning the object to the domain of the application from the calling library member provides the application with access to and use of the native resource.

34. The computer readable storage medium as defined in claim 32, wherein the managed code portion includes:
the domain of the application in user code; and
a virtual machine;
in the native code portion:
a virtual machine execution engine;
the handle; and
the operating system.

35. The computer readable storage medium as defined in claim 32, wherein the steps further comprises releasing the native resource by:
identifying the handle containing the object that references the domain of the application; and
when the name and address of the native resource to be released is contained in the object that references the domain of the application, removing the handle to release the native resource.

36. The computer readable storage medium as defined in claim 32, wherein the native code portion of the computer environment has access a plurality of handle tables each containing one or more said objects referencing one said domain of the application.

37. The computer readable storage medium as defined in claim 32, wherein the steps further comprise, for each termination of the domain of the application:
identifying each said handle containing an object that references the domain of the application; and
removing each said identified handle to release the native resource for which the name and address is contained in the object that references the domain of the application.

38. The computer readable storage medium as defined in claim 32, wherein the step of creating a plurality of handles further comprises, prior to creating each said handle:
reviewing each said handle that was previously created to determine if the domain of the application referenced by the object of the handle is no longer using the native resource for which the name and address thereof is contained in the object of the handle and which said native resource had been allocated in response to the request from the domain of the application;
for each said native resource determined to be no longer used, removing the handle containing the object that includes the name and address of the native resource determined to be no longer used to thereby release the native resource.

39. The computer readable storage medium as defined in claim 32, wherein the step of determining that the handle cannot be created further comprises determining that a predetermined number is exceeded by a count of those handles that contain an object naming one said native resource that:
is of like kind to the native resource requested by the domain of the application; and
is still being used by the domain of the application that is referenced by the object.

40. The computer readable storage medium as defined in claim 32, wherein the library member is selected from the group consisting of a managed drawing library member and a managed windowing library member.

41. An apparatus having a processor comprising:
a virtual machine operating in a managed code portion for executing an application;
an execution engine for the virtual machine operating in a native code portion;
an operating system upon which the virtual machine execution engine is stacked;
means for requesting a native resource with the application;
means for creating a handle in the native code portion, the handle containing an object that references the application and the name and address of the native resource;
means for returning the object to the application for use of the native resource;
means for automatically checking the application to determine if the native resource can be released;
means for creating a plurality of handles corresponding to a plurality of native resources allocated in response to a respective plurality of requests from one or more said applications, wherein each said handle contains an object that references one said application and that includes the name and address of one said native resource, wherein the means for creating a plurality of handles further comprises means, prior to creating each said handle:
for determining that the handle cannot be created by determining that the native resource requested by the application is unavailable;
for reviewing each said handle that was previously created to determine if the application referenced by the object of the handle is no longer using the native resource named in the object of the handle;
for removing the handle containing the object that includes the name of the native resource determined to be no longer used to thereby release the native resource, for each said native resource determined to be no longer used;
for reallocating the released said native resource, when a released said native resource corresponds to the native resource determined to be unavailable, by using:
means for creating a handle containing an object that references the requesting said application; and,
means for inputting the name and address of the released said native resource in the object in the created handle.

42. The apparatus as defined in claim 41, wherein the means for returning the object to the application provides the application with access to and use of the native resource.

43. The apparatus as defined in claim 41, wherein the means for requesting a native resource with an application further comprising means for requesting the native resource with a component of the application.

44. The apparatus as defined in claim 41, further comprising means for releasing the native resource that includes:

means for identifying the handle containing the object that references the application; and means for removing the handle to release the native resource when the name and address of the native resource to be released is contained in the object that references the application.

45. The apparatus as defined in claim 41, further comprising a plurality of handle tables in the native code portion, wherein each said handle table contains one or more said objects referencing one said application.

46. The apparatus as defined in claim 41, further comprising means, when terminating one said application, for removing each said handle identified as containing an object that references the application to thereby release the native resource named in the object of the handle so identified.

47. The apparatus as defined in claim 41, further comprising, for each termination of each said application:

means for identifying each said handle containing an object that references the application; and means for removing each said identified handle to release the native resource for which the name and address thereof is contained in the object.

48. The apparatus as defined in claim 41, wherein the means for creating a plurality of handles further comprises means, prior to creating each said handle:

for reviewing each said handle that was previously created to determine if the application referenced by the object of the handle is no longer using the native resource contained in the object of the handle; and for removing the handle containing the object that includes the name of the native resource determined to be no longer used to thereby release the native resource for each said native resource determined to be no longer used.

49. The apparatus as defined in claim 41, wherein the means for determining that the native resource requested by the application is unavailable comprises means for determining that a predetermined number is exceeded by a count of the number of the handles that contain an object that names one of the native resources that:

is of like kind to the native resource requested by the application; and is still being used by the application referenced by the object.

* * * * *